(12) United States Patent
Buican et al.

(10) Patent No.: US 6,356,436 B1
(45) Date of Patent: Mar. 12, 2002

(54) PANEL MOUNTING APPARATUS

(75) Inventors: Eugene Buican, Austin; Paul Higgins, Round Rock, both of TX (US)

(73) Assignee: Dell USA, L.P., Round Rock, TX (US)

( * ) Notice: Subject to any disclaimer, the term of this patent is extended or adjusted under 35 U.S.C. 154(b) by 0 days.

(21) Appl. No.: 09/385,561

(22) Filed: Aug. 30, 1999

(51) Int. Cl.[7] .............................. G06F 1/16; A47B 81/01
(52) U.S. Cl. ..................... 361/683; 312/223.2; 312/222; 312/216; 312/263; 395/800.01
(58) Field of Search ................................. 361/679–686; 312/223.2, 216, 263, 219, 223.1, 222, 292.2, 292.3; 395/800.01, 828, 280

(56) References Cited

U.S. PATENT DOCUMENTS

| | | |
|---|---|---|
| 3,671,065 A | 6/1972 | Bingham |
| 4,679,368 A | 7/1987 | Pettinga et al. |
| 4,777,565 A * | 10/1988 | McIntosh ..................... 361/683 |
| 4,974,740 A | 12/1990 | Niles et al. |
| 4,993,758 A | 2/1991 | Schmutzler |
| 5,031,070 A | 7/1991 | Hsu |
| 5,348,356 A | 9/1994 | Moulton |
| 5,547,272 A * | 8/1996 | Paterson et al. .......... 312/223.2 |
| 5,593,219 A * | 1/1997 | Ho .............................. 361/683 |
| 5,593,220 A | 1/1997 | Seid et al. |
| 5,713,647 A | 2/1998 | Kim |
| 5,751,545 A | 5/1998 | Jung |
| 5,820,235 A | 10/1998 | Tsai |
| 5,823,644 A | 10/1998 | Suh et al. |
| 5,825,626 A * | 10/1998 | Hulick et al. ................ 361/724 |
| 5,826,922 A | 10/1998 | Wernig |
| 5,852,739 A * | 12/1998 | Radloff et al. ............... 361/683 |
| 5,882,052 A | 3/1999 | Whitehead |
| 5,931,550 A * | 8/1999 | Chen ......................... 312/223.2 |
| 6,015,195 A * | 1/2000 | Anderson et al. ........... 361/683 |
| 6,053,586 A * | 4/2000 | Cook et al. ............... 312/223.2 |
| 6,064,568 A * | 5/2000 | Schmitt ....................... 361/685 |
| 6,181,549 B1 * | 1/2001 | Mills et al. .................. 361/683 |

* cited by examiner

Primary Examiner—Leo P. Picard
Assistant Examiner—Lea Edmonds
(74) Attorney, Agent, or Firm—Haynes and Boone, LLP

(57) ABSTRACT

A mounting system for attaching a panel to a chassis includes a chassis having a top, a bottom and opposing sides. A guide portion is attached adjacent to the top of the chassis. A latch is movably mounted to the chassis adjacent to the guide portion. The guide portion engages the latch to limit the movement of the latch along a reference axis defined by the guide portion. A resilient member is connected between the latch and the chassis for biasing the latch to a static position. A panel is pivotally attached adjacent to the bottom of the chassis. The panel is engaged by the latch to retain the panel in a closed position. The latch is movable to a displaced position for releasing the panel to allow the panel to be moved to an open position. The panel can be accurately and consistently aligned and attached to the chassis of the computer system after each removal. Furthermore, the panel can be quickly and easily engaged and disengaged with minimal force without the use of tools or having to manipulate fasteners such as screws.

28 Claims, 5 Drawing Sheets

PANEL MOUNTING APPARATUS

BACKGROUND

The disclosures herein relate generally to computer systems and more particularly to a panel mounting apparatus for an enclosure of a computer system.

A computer system such as a desktop personal computer typically includes a chassis made of a metal material. To provide for an aesthetically pleasing appearance and for various functional purposes, a variety of plastic panels are used to cover portions of the chassis. Typically, the top, sides and front of the chassis are substantially covered by plastic panels. The front is typically covered with a bezel panel. The sides are generally covered with side panels. One of the side panels is generally removable and one may be stationary. The removable side panel is intended to provide relatively easy access to the system components mounted within the chassis. The top of the chassis is generally covered with a top panel. However, in some computer designs, the top panel and at least one of the side panels are integrally formed.

Some panels are mounted with panel mounting systems that make the panels difficult to remove and reinstall. This includes systems that utilize a sliding panel configuration. The ease by which the panel can be removed and reinstalled is adversely affected by interference between the chassis and the panels. Other panel mounting systems utilize a detachable clip configuration that allows the panel to be unhooked from the chassis and then lifted out of the way. The detachable clips are susceptible to breakage and require precise alignment to properly reinstall the panel.

U.S. Pat. No. 5,826,922 discloses a rotary latch assembly which allows for the attachment of a computer bezel to a computer housing. Latches disposed on each side of the bezel engage openings in the computer housing so as to secure the bezel to the computer housing. The latches are attached to rails which include gears. A knob which includes rotary gears extends through an opening in the bezel. The rotary gears engage the gears of both of the rails such that the latches may be moved within a limited range by rotating the knob. Thus, the bezel may be removed by rotating the knob such that the latches move inward, thereby disengaging the latches from the openings in the computer housing.

U.S. Pat. No. 5,820,235 discloses a front panel assembly for attachment to a mainframe of a computer. The panel assembly includes a base frame having two longitudinal sliding grooves bilaterally disposed at the front side, and a bottom cover on the lower half of the base frame including an air filter. A gear holder is mounted on the base frame and holds a gear. A dust cover is mounted on the base frame and moves along the longitudinal sliding grooves between closed and open positions. The dust cover has a longitudinal rack meshed with the gear and a locating hole at the back near the top. A latch on the base frame is forced by a spring into engagement with the locating hole of the dust guard to lock the dust guard in the closed position, and a spring-supported press button on the base frame is controlled to release the latch from the locating hole of the dust guard.

U.S. Pat. No. 5,751,545 discloses a chassis of a desktop personal computer where the cover can be assembled onto or removed from the base by a user without the use of screws or tools. This allows the user to gain easy access to the electrical components inside the chassis. The design of the base and the cover incorporates a set of guide pins to be inserted into a corresponding set of guide holes in order to properly position the cover onto the base. The cover is fastened to the base by rotating a buckle pivotally attached to the cover so that it engages the base. Finally, a slidable detent located on the cover can be slid onto the buckle, preventing the buckle from inadvertently becoming unfastened. To disassemble the cover from the base, the process is reversed. First, the detent is slid off the buckle, allowing the buckle to rotate. Next, the buckle is disengaged from the base by pivoting it open. Finally, the cover is removed from the base by sliding the cover off the base while extracting the guide pins from the guide pin holes.

U.S. Pat. No. 5,713,647 discloses a computer case that allows a user to open and close the case without the use of special tools or screws. A user slides two sliders on the cover of the case toward each other and lifts up the front portion of the cover to gain access to the interior of the case. The slider is monolithically integrated with a latch. The latch contains two spaced-apart arms and a recess. One of the arms of the latch is arcuate for guiding a portion of the base and a portion of a cover into the recess so that both portions are mated for preventing inadvertent opening of the case. This mating can be accomplished by sliding a pair of sliders in the appropriate directions. To disengage the cover from the base, the sliders are actuated to move a portion of the base from contact with a portion of the cover. When the case is released, the front of the cover can be lifted up. A pair of hinges in the rear of the case allows the front of the case to be pivoted open while preventing the cover from being completely detached from the base.

In many instances, the panels are not properly positioned when they are reinstalled. As a result, the intended electromagnetic interference protection provided by metallic shields attached to the various plastic panels is reduced and the panels cannot be locked in place. Furthermore, for ergonomic and marketing reasons, removal of the various panels for accessing the system components should not be an undesirable experience for the computer user.

Accordingly, there is a need for a cost-effective mounting system that allows panels to be easily and reliable installed on and removed from the chassis of a computer system.

SUMMARY

One embodiment, accordingly, provides a latch that allows a panel to be removably attached to the chassis of a computer system. To this end, a latch has an elongated main body including opposing sides, opposing edges and a longitudinal axis. A guide portion is attached to a first one of the opposing sides. The guide portion defines a displacement axis extending generally parallel to the longitudinal axis of the main body. A resilient member is attached adjacent the main body. A catch portion is attached to the main body and includes a retention surface extending in a direction generally perpendicular to the opposing sides of the main body.

A principal advantage is that a removable panel is accurately and consistently aligned and attached to the chassis of the computer system after each removal.

DETAILED DESCRIPTION

Figure 1:
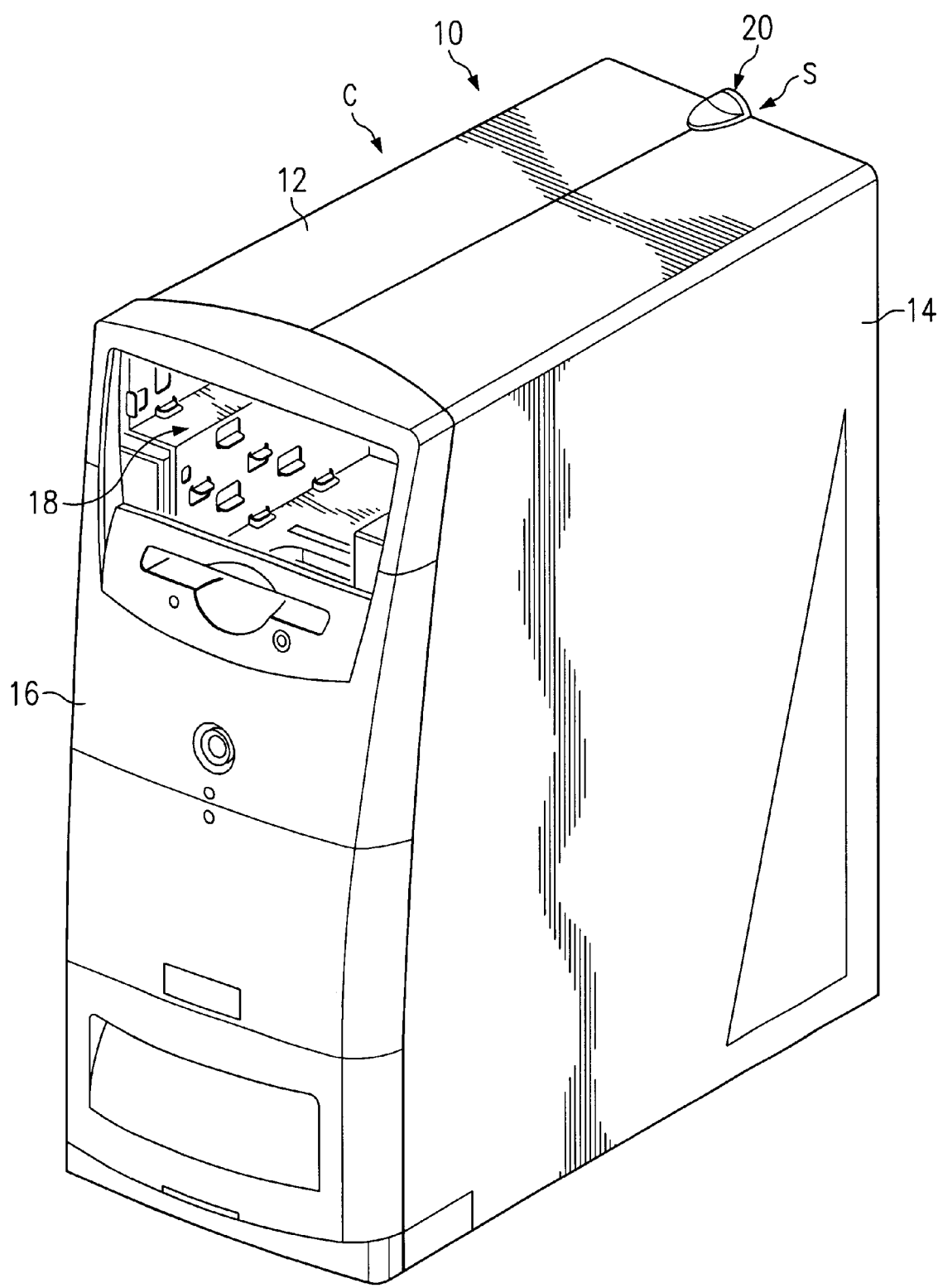
FIG. 1 is a perspective view illustrating an embodiment of a computer including a plurality of panels.
Figure 2:
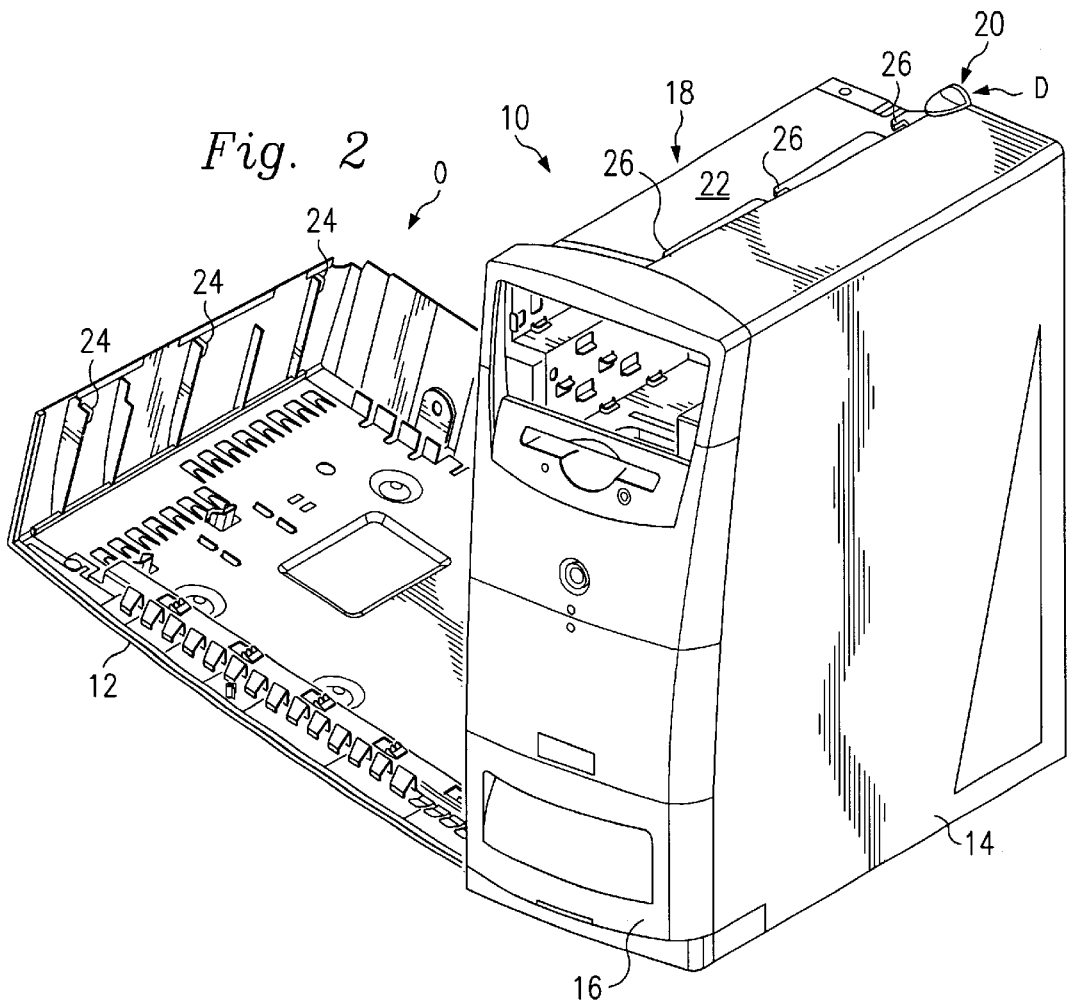
FIG. 2 is a perspective view illustrating an embodiment of the computer with a removable panel in an open position.
Figure 3:
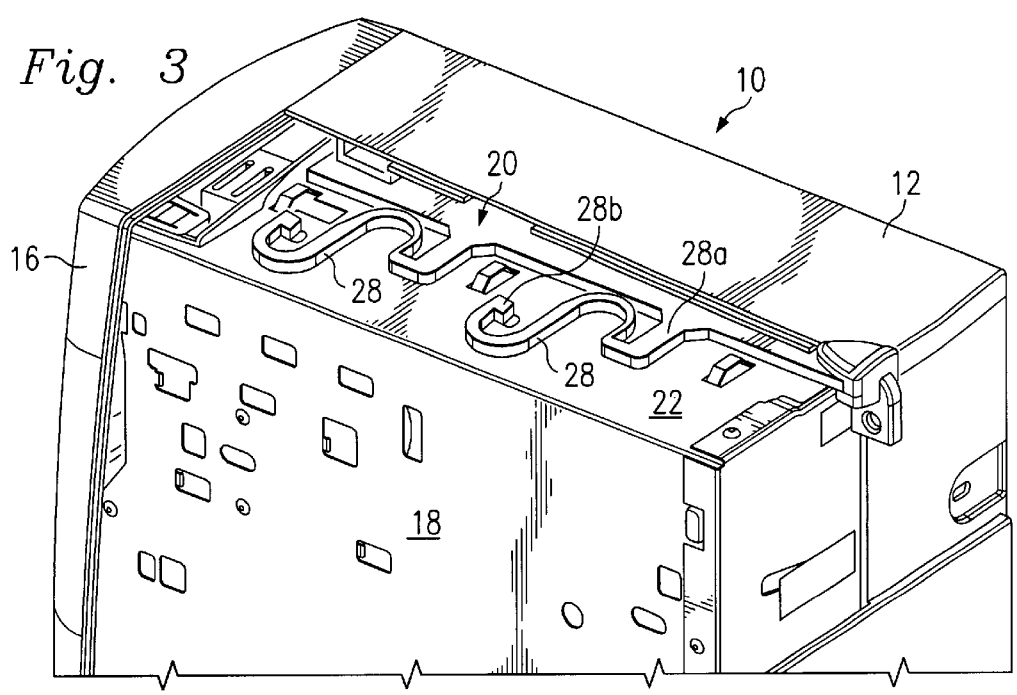
FIG. 3 is a fragmented perspective view illustrating an embodiment of the computer with a stationary panel removed.

An embodiment of a computer 10 is illustrated in FIGS. 1–3. The computer 10 includes a removable panel 12, a stationary panel 14 and a front bezel panel 16 attached to a chassis 18. The removable panel 12 is pivotally attached to the chassis 18 and is removable to provide access to contents attached to the chassis 18. The stationary panel 14 may be removed, but is typically considered to be a stationary panel in operation as the contents within the chassis 18 are not generally accessible.

The removable panel 12 is movable between a closed position C, FIG. 1, and an open position O, FIG. 2. A latch 20 is attached to a top 22, FIGS. 2 and 3, of the chassis 18. The removable panel 12 includes retaining members 24, FIG. 2, and the latch 20 includes catch portions 26 that engage the retaining members 24 to retain the removable panel 12 in the closed position C. The removable panel 12 is retained in the closed position C when the latch 20 is in a static position S, FIG. 1. The latch 20 may be moved to a displaced position D, FIG. 2, to release the removable panel 12 and allow it to be moved to the open position O.

One or more resilient members 28, FIG. 3, are coupled between the chassis 18 and the latch 20 to bias the latch 20 to the static position S. A first end 28a of each resilient member 28 is attached to the latch 20 and a second free end 28b is attached to the chassis 18.

Figure 4:
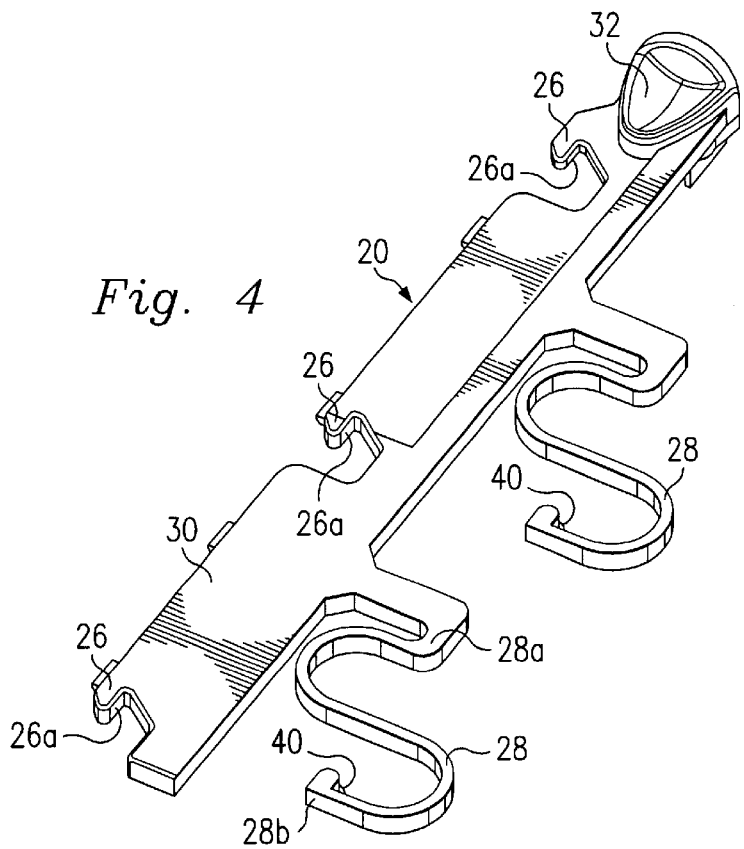
FIG. 4 is a perspective view illustrating an embodiment of a top portion of a latch.
Figure 5:
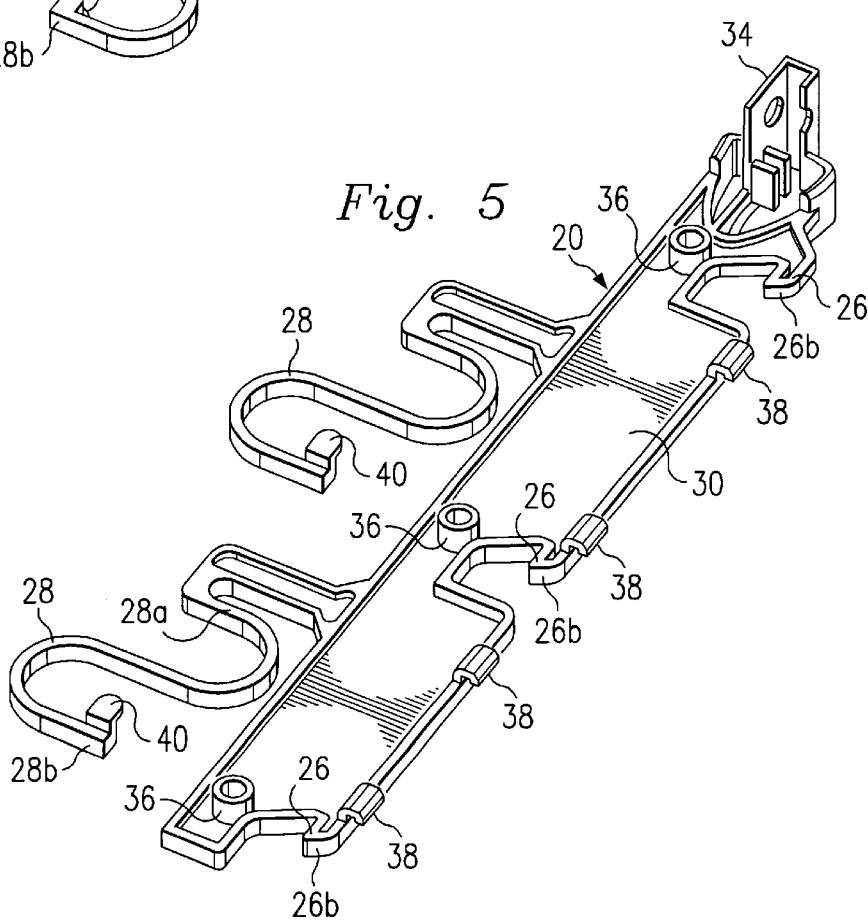
FIG. 5 is a perspective view illustrating an embodiment of a bottom portion of the latch of FIG. 4.

As shown in FIGS. 4 and 5, each catch portion 26 includes a retention surface 26a and a lead-in surface 26b. When the removable panel 12 is in the closed position C, each retaining member 24 is engaged by the retention surface 26a of the corresponding catch portion 26. The lead-in surface 26b has a contoured profile. The contoured profile is configured such that when the removable panel 12 is being moved from the open position O to the closed position C, the engagement of each retaining member 24 against a corresponding catch portion 26 urges the latch 20 toward the displaced position D without having to manually manipulate the latch 20.

The latch 20 includes an elongated beam portion 30, FIGS. 4 and 5. The catch portions 26, a finger receptacle 32, a locking tab 34, pins 36, and latch mounting tabs 38 are attached to the beam portion 30. A retention tab 40 is attached to free end 28b of each resilient member 28.

The catch portions 26, resilient members 28, beam portion 30, finger receptacle 32, locking flange 34, alignment pins 36, latch mounting tabs 38 and retention tabs 40 may be integrally formed from a polymeric material such as Polycarbonate, Acrylonitrile Butadiene Styrene (commonly known as ABS) or a combination thereof using a process such as injection molding. Although the resilient members 28 are shown to be integrally formed with the latch 20, discrete types of springs such as compression, torsion and leaf springs are also contemplated to be used as resilient members within the scope of this disclosure.

Figure 6:
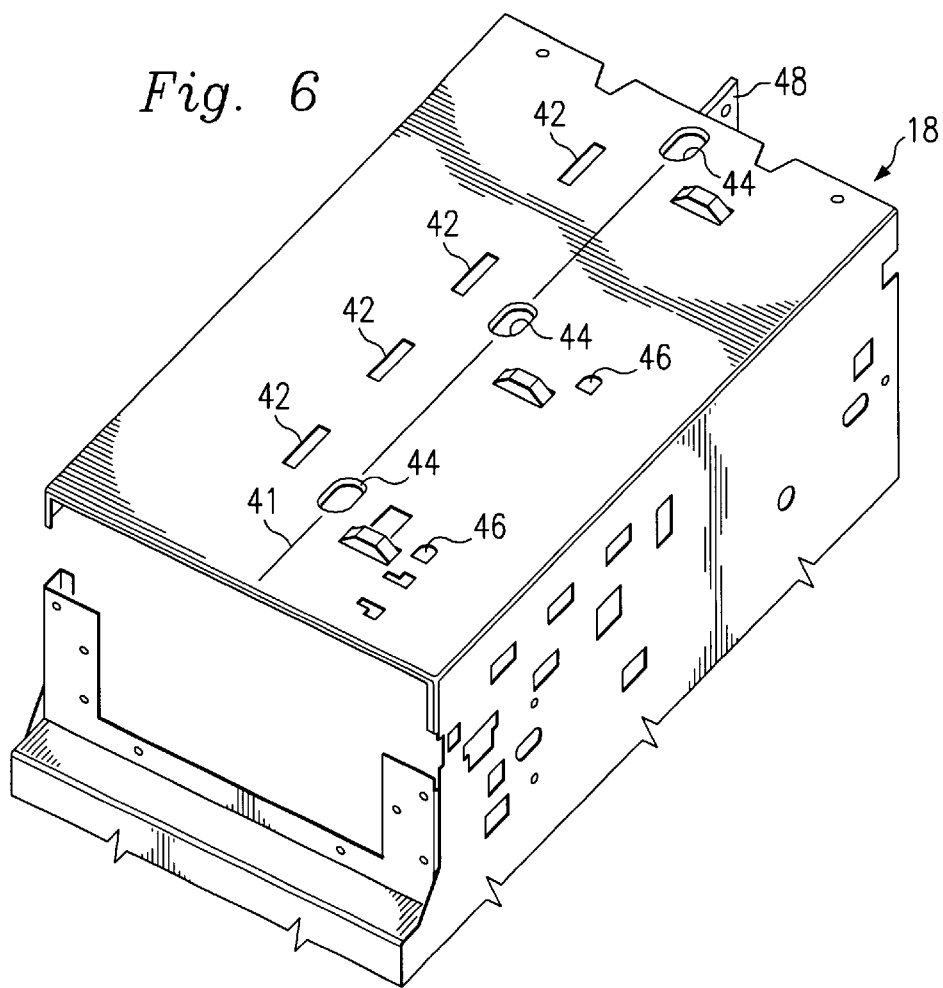
FIG. 6 is a fragmented perspective view illustrating an embodiment of the chassis of FIG. 3.

Each alignment pin 36, latch mounting tab 38 and retention tab 40 is received in a respective corresponding guide opening 42, guide opening 44 and opening 46, FIG. 6, formed in the chassis 18. Each guide opening 42 and each guide opening 44 are elongated to allow the latch 20 to be displaced from the static position S to the displaced position D. The openings 44 are aligned to define a longitudinal axis 41 along which the latch 20 is displaced. The opening 46 and the retention tab 40 are configured to constrain the second end 28b of each resilient member 28. A locking flange 48 is attached to the chassis 18. A security device such as a lock may be attached to the locking tab 34 and locking flange 48 to restrain the latch 20 from being displaced from the static position S.

Figure 7:
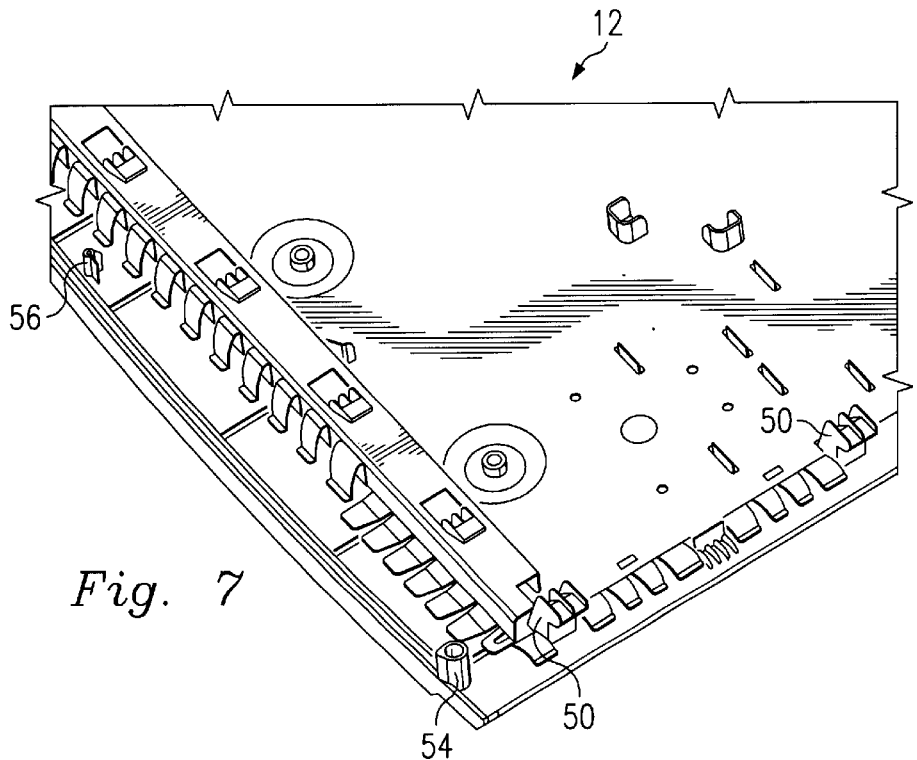
FIG. 7 is a fragmented perspective view illustrating an embodiment of the chassis mounting portion of a panel.
Figure 8:
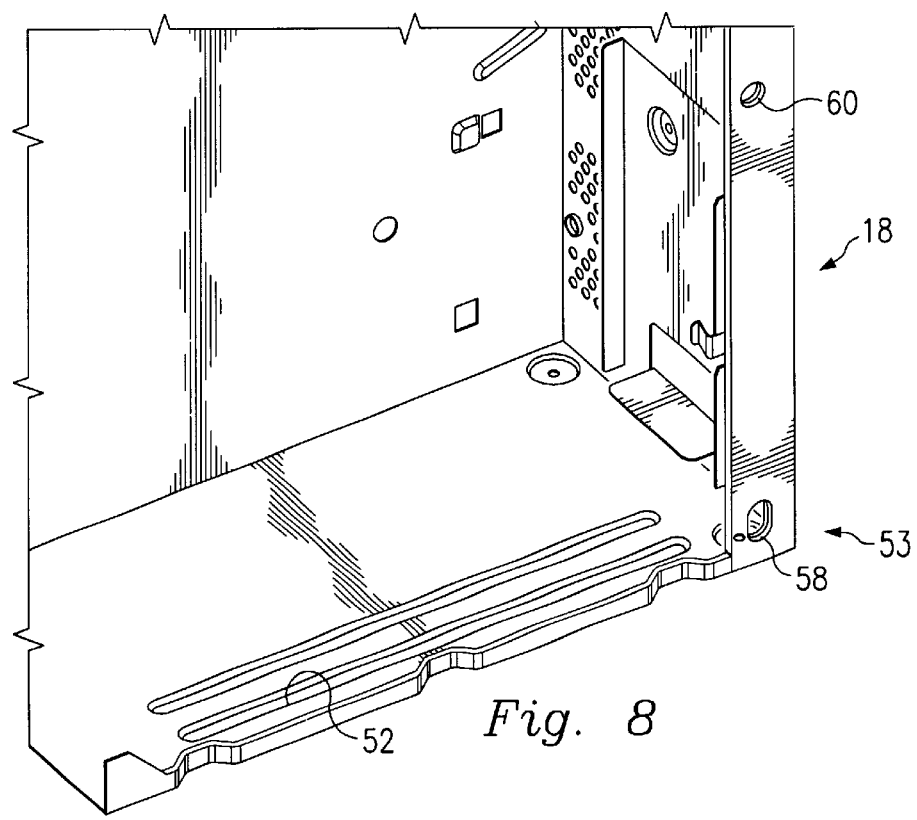
FIG. 8 is a fragmented perspective view illustrating an embodiment of a panel mounting portion of a chassis.

Referring now to FIGS. 7 and 8, the removable panel 12, FIG. 7, includes mounting members 50 that engage a recessed portion 52, FIG. 8, adjacent to a bottom portion 53 of the chassis 18. The mounting members 50 releasably engage the recessed portion 52 of the chassis 18 to allow the removable panel 12 to pivot and be easily removed from the chassis 18 without the use of tools or having to manipulate fasteners such as screws. An alignment pin 54, FIG. 7, provided for grossly aligning the removable panel 12 with the chassis 18 to simplify positioning of the removable panel 12 during installation, is attached adjacent to each opposing edge of the removable panel 12. One or more alignment pins 56 are also attached adjacent to each opposing edge of the removable panel 12 for insuring that the removable panel 12 is properly aligned with the chassis 18. The alignment pins 54, 56 engage corresponding apertures 58, 60 respectively, formed in the chassis 18. Each aperture 58 is sized to provide a relatively large amount of clearance with respect to the corresponding alignment pin 54. Each aperture 60 is sized to provide a relatively small amount of clearance with respect to the corresponding alignment pin 56.

Figure 9:
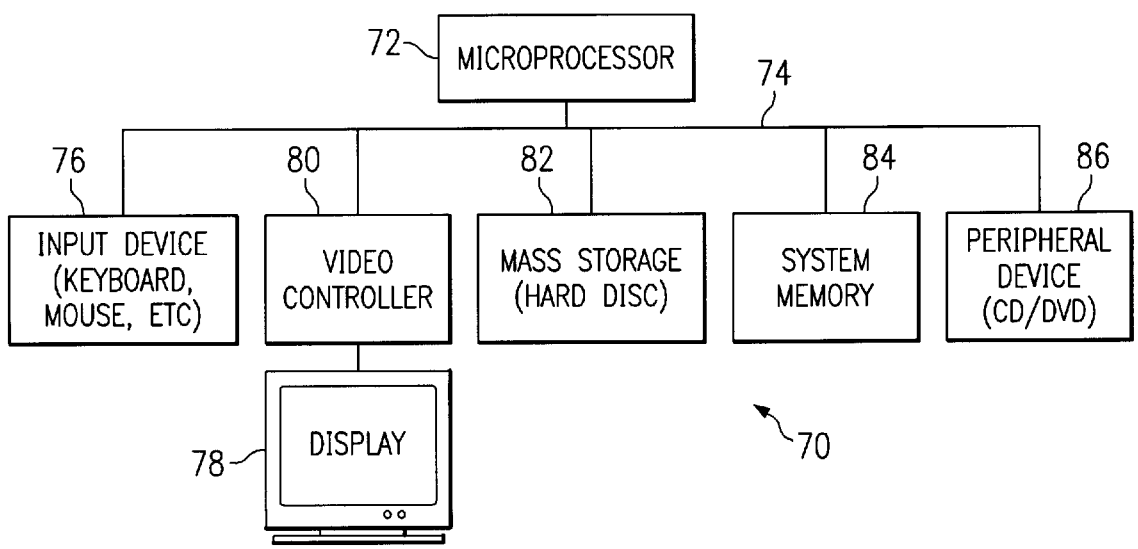
FIG. 9 is a block diagram illustrating an embodiment of a computer system.

An embodiment of a computer system 70 is illustrated in FIG. 9. The computer system 70 includes at least one microprocessor 72. The microprocessor 72 is connected to a bus 74. The bus 74 serves as a connection between the microprocessor 72 and other components of the computer system 70. One or more input devices 76 may be coupled to the microprocessor 72 to provide input to the microprocessor 72. Examples of input devices include keyboards, touchscreens, and pointing devices such as a mouse, a trackball and a trackpad. The computer system 70 may also include a display 78 which is coupled to the microprocessor 72 typically by a video controller 80. Programs and data are stored on a mass storage device 82 which is coupled to the microprocessor 72. Mass storage devices include components such as hard disks, optical disks, magneto-optical drives, floppy drives, and the like. A system memory 84 provides the microprocessor 72 with fast storage to facilitate execution of computer programs by the microprocessor 72. A peripheral device 86 may be connected to the microprocessor 72 for providing the computer system 70 with additional functionality. Examples of peripheral devices include floppy disk drives, hard disk drives, compact disc players, digital video disc players, memory card readers, and other types of devices. The various components of the computer system are typically mounted in a chassis such as chassis 18, or in an enclosure of a desktop or portable computer. It should be understood that other busses and intermediate circuits can be employed between the components described above and microprocessor 72 to facilitate interconnection between the components and the microprocessor 72.

In operation, a panel such as the removable panel 12 is detached from the chassis 18 by removing a security device from the locking tab 34 of the latch 20, if one is attached. The latch 20 is moved from the static position S to the displaced position D such that each retaining member 24 disengages from the corresponding catch portion 26 of the latch 20. The panel may then be pivoted away from the chassis 18 and detached from the chassis 18 by lifting it to disengage each mounting member 50 from the recessed portion 52.

Removable panel 12 is attached to the chassis 18 by engaging the mounting members 50 in the recessed portion 52 of the chassis 18. The panel 12 is then pivoted toward the chassis 18 until each retaining member 24 comes into contact with the lead-in surface 26b of the corresponding catch portion 26. By continuing to pivot the panel 12 toward the chassis 18, each retaining member 24 acts on the corresponding lead-in surface 26b of the corresponding catch portion 26 to move the latch 20 toward the displaced position A. With continued pivoting, the latch 20 is sufficiently displaced for each retaining member 24 to clear the corresponding catch portion 26. Once the retaining members 24 clear the catch portions 26, the latch 20 returns to the static position S such that each retaining member 24 is engaged by the respective retention surface 26a.

One embodiment provides a latch including an elongated main body having opposing sides, opposing longitudinal edges and a longitudinal axis. A guide portion is attached to a first one of the opposing sides. The guide portion defines a displacement axis extending generally parallel to the longitudinal axis of the main body. A resilient member and a catch portion are attached to the main body. The catch portion includes a retention surface extending in a direction generally perpendicular to the opposing sides of the main body.

Another embodiment provides a computer system including a chassis having a top, a bottom and opposing sides. A microprocessor is mounted in the chassis. A guide portion is attached adjacent to the top of the chassis. A latch is movably mounted to the chassis adjacent to the guide portion. The guide portion engages the latch to constrain movement of the latch along a reference axis defined by the guide portion. A resilient member is connected between the latch and the chassis for biasing the latch to a static position. A panel is pivotally attached adjacent to the bottom of the chassis. The panel is engaged by the latch to retain the panel in a closed position and the latch is movable to a displaced position for releasing the panel to allow the panel to be moved to an open position.

In a further embodiment provides a mounting system for attaching a panel to a chassis. The mounting system includes a chassis including a top, a bottom and opposing sides. A guide portion is attached adjacent to the top of the chassis and a latch movably mounted to the chassis adjacent to the guide portion. The guide portion engages the latch to limit the movement of the latch along a reference axis defined by the guide portion. A resilient member is connected between the latch and the chassis for biasing the latch to a static position. A panel is pivotally attached adjacent to the bottom of the chassis. The panel is engaged by the latch to retain the panel in a closed position. The latch is movable to a displaced position for releasing the panel to allow the panel to be moved to an open position.

As it can be seen, the embodiments presented herein provide several advantages. The removable panel may be accurately and repeatedly aligned and attached to the chassis of the computer system. The removable panel is secured in position by a single latch mechanism. The interior contents of the chassis may be inspected without fully removing the removable panel from the chassis. The latching mechanism is engaged and disengaged with minimal force without the use of tools or having to manipulate fasteners such as screws. The removable panel is precisely aligned to the chassis.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A computer panel latch assembly, comprising:
   a computer chassis;
   an elongated main body including opposing sides, opposing longitudinal edges and a longitudinal axis;
   a guide portion on the chassis attached to a first one of the opposing sides, the guide portion defining a displacement axis extending generally parallel to the longitudinal axis of the main body;
   a resilient member attached adjacent to the main body, the resilient member being a cantilever member having a free end engaged with the chassis; and
   a catch portion attached to the main body, the catch portion including a retention surface extending in a direction generally perpendicular to the opposing sides of the main body.

2. The latch of claim 1 wherein the resilient member is attached adjacent to a first one of the opposing longitudinal edges and the catch portion is attached adjacent to a second one of the opposing longitudinal edges.

3. The latch of claim 1 further comprising a locking tab attached to the main body.

4. The latch of claim 3 wherein the locking tab is integrally formed with the main body.

5. The latch of claim 1 wherein the catch portion includes a lead-in surface opposite the retention surface.

6. The latch of claim 1 wherein the resilient member is attached to one of the longitudinal edges of the main body.

7. The latch of claim 1 wherein the resilient member is integrally formed with main body.

8. The latch of claim 1 further comprising a retention tab attached to the resilient member, the retention tab being attached to the resilient member at a distal end of the main body.

9. The latch of claim 1 wherein the guide portion is integrally formed with the main body.

10. The latch of claim 1 further comprising mounting tabs attached to the main body.

11. A computer chassis latch, comprising:
    a computer chassis;
    an elongated main body including opposing sides, opposing longitudinal edges and a longitudinal axis;
    a guide portion on the chassis attached to a first one of the opposing sides, the guide portion defining a displacement axis extending generally parallel to the longitudinal axis of the main body;
    a resilient cantilevered member attached adjacent to the main body, wherein the cantilevered member is contoured; and
    a catch portion attached to the main body, the catch portion including a retention surface extending in a direction generally perpendicular to the opposing sides of the main body.

12. The latch of claim 11 wherein the resilient member is S-shaped.

13. A computer panel latch, comprising
a computer chassis;
an elongated main body including opposing sides, opposing longitudinal edges and a longitudinal axis;
a guide portion on the chassis attached to a first one of the opposing sides, the guide portion defining a displacement axis extending generally parallel to the longitudinal axis of the main body;
a resilient member attached adjacent to the main body;
a catch portion attached to the main body, the catch portion including a retention surface extending in a direction generally perpendicular to the opposing sides of the main body; and
a finger receptacle attached to the main body.

14. A computer system, comprising:
a chassis including a top, a bottom and opposing sides;
a microprocessor mounted in the chassis;
an input coupled to provide input to the microprocessor;
a mass storage coupled to the microprocessor;
a video controller coupled to the microprocessor;
a memory coupled to provide storage to facilitate execution of computer programs by the microprocessor;
a guide portion on the chassis attached adjacent to the top of the chassis;
a latch movably mounted to the chassis adjacent to the guide portion, the guide portion engaging the latch to constrain movement of the latch along a reference axis defined by the guide portion;
a resilient member connected between the latch and the chassis for biasing the latch to a static position, the resilient member being a cantilever member having a free end engaged with the chassis; and
a panel pivotally attached adjacent to the bottom of the chassis, the panel being engaged by the latch to retain the panel in a closed position and the latch being movable to a displaced position for releasing the panel to allow the panel to be moved to an open position.

15. The computer system of claim 14 wherein the panel includes a plurality of mounting members, the mounting members pivotally engaging the chassis.

16. The computer system of claim 14 further comprising an alignment pin attached to the panel and wherein the chassis includes an aperture for receiving the alignment pin.

17. The computer system of claim 16 further comprising a first alignment pin and a second alignment pin attached to the panel and further comprising a first aperture and a second aperture in the chassis for receiving each respective alignment pin.

18. The computer system of claim 17 wherein the first aperture is positioned adjacent to the bottom of the chassis, the first aperture and first alignment pin being sized to provide a first clearance therebetween, and wherein the second aperture is spaced apart from the first aperture, the second aperture and the second alignment pin being sized to provide a second clearance therebetween, the first clearance being greater than the second clearance.

19. The computer system of claim 14 wherein the latch includes an elongated main body including opposing sides, opposing longitudinal edges and a longitudinal axis.

20. The computer system of claim 19 further comprising a catch portion attached to the main body, the catch portion including a retention surface extending in a direction generally perpendicular to the opposing sides of the main body.

21. The computer system of claim 20 wherein the resilient member is attached adjacent to a first one of the opposing longitudinal edges and the catch portion is attached adjacent to a second one of the opposing longitudinal edges.

22. The computer system of claim 19 further comprising a locking tab attached to the main body.

23. The computer system of claim 14 wherein the resilient member is attached to one of the longitudinal edges of the main body.

24. The computer system of claim 14 further comprising a retention tab attached to the resilient member at a distal end of the main body and being received in an aperture in the chassis.

25. The computer system of claim 14 further comprising mounting tabs attached to the main body, the mounting tabs being received in apertures in the chassis.

26. A computer system, comprising:
a chassis including a top, a bottom and opposing sides;
a microprocessor mounted in the chassis;
an input coupled to provide input to the microprocessor;
a mass storage coupled to the microprocessor;
a video controller coupled to the microprocessor;
a memory coupled to provide storage to facilitate execution of computer programs by the microprocessor;
a guide portion on the chassis attached adjacent to the top of the chassis;
a latch movably mounted to the chassis adjacent to the guide portion, the guide portion engaging the latch to constrain movement of the latch along a reference axis defined by the guide portions;
a resilient cantilevered member connected between the latch and the chassis for biasing the latch to a static position, wherein the cantilevered member is contoured; and
a panel pivotally attached adjacent to the bottom of the chassis, the panel being engaged by the latch to retain the panel in a closed position and the latch being movable to a displaced position for releasing the panel to allow the panel to be moved to an open position.

27. The computer system of claim 26 wherein the resilient member is S-shaped.

28. A mounting system for attaching a panel to a chassis, comprising:
a chassis including a top, a bottom and opposing sides;
a guide portion on the chassis attached adjacent to the top of the chassis;
a latch movably mounted on the chassis adjacent to the guide portion, the guide portion engaging the latch to limit the movement of the latch along a reference axis defined by the guide portions;
a resilient member connected between the latch and the chassis for biasing the latch to a static position, the resilient member being a cantilever member having a free end engaged with the chassis; and
a panel pivotally attached adjacent to the bottom of the chassis, the panel being engaged by the latch to retain the panel in a closed position and the latch being movable to a displaced position for releasing the panel to allow the panel to be moved to an open position.

* * * * *